F. J. VICKMAN.
LEVER LOCKING AND RELEASING MEANS.
APPLICATION FILED FEB. 17, 1914.
1,171,990. Patented Feb. 15, 1916.
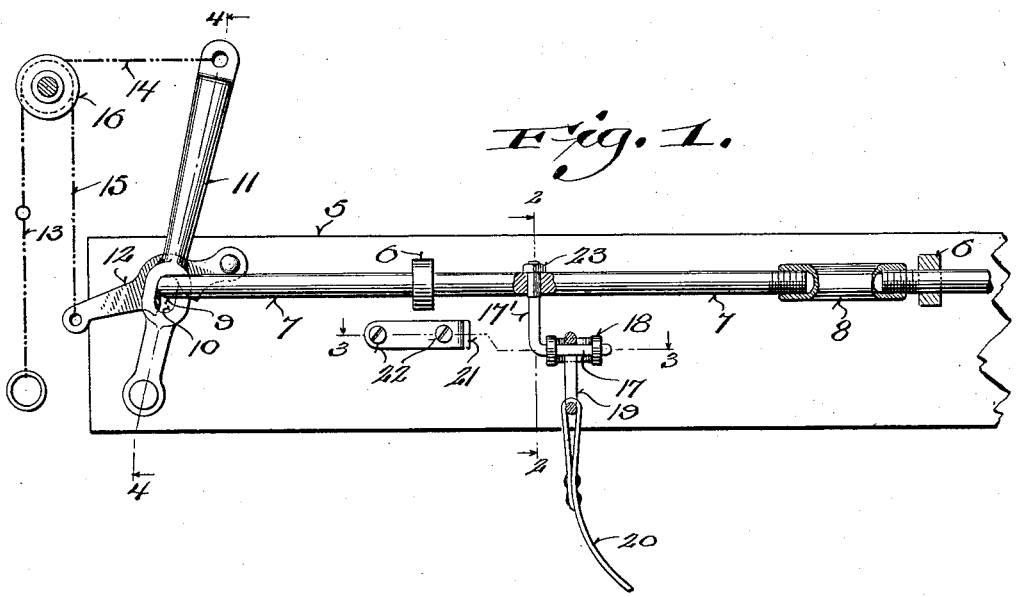
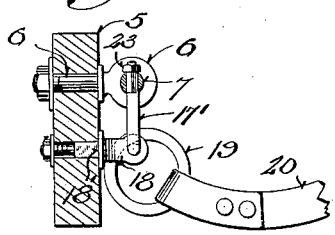
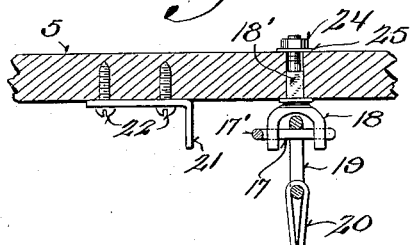
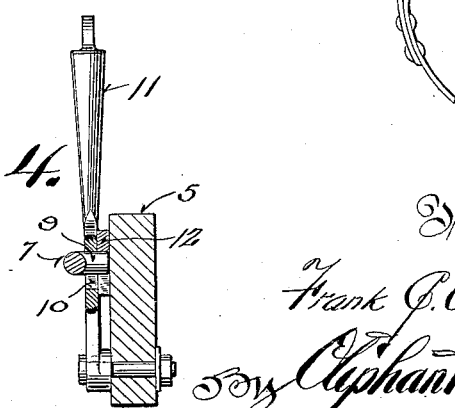

UNITED STATES PATENT OFFICE.

FRANK J. VICKMAN, OF WALSH, WISCONSIN.

LEVER LOCKING AND RELEASING MEANS.

1,171,990.  Specification of Letters Patent.  Patented Feb. 15, 1916.

Application filed February 17, 1914.  Serial No. 819,202.

*To all whom it may concern:*

Be it known that I, FRANK J. VICKMAN, a citizen of the United States, and resident of Walsh, in the county of Marinette and State of Wisconsin, have invented certain new and useful Improvements in Lever Locking and Releasing Means; and I do hereby declare that the following is a full, clear, and exact description thereof.

My invention consists in what is herein particularly set forth with reference to the accompanying drawings and pointed out in the claims of this specification, its object being to provide simple, economical and efficient means for instantaneous release of animals halter fastened in a stable, the mechanism described being organized for operation in the stable or from the outside thereof, and said invention is especially designed for the release of said animals in case of a fire in said stable or with which it may be threatened.

Figure 1 of the drawings represents a partly sectional front elevation of means in accordance with my invention for the instantaneous release of one or more animals fastened in a stable, and Figs. 2, 3 and 4 are partly sectional views respectively indicated by lines 2—2, 3—3 and 4—4 in Fig. 1.

Referring by numerals to the drawings, 5 indicates a support that may constitute the front of a feed-trough for stabled animals, 6 guide-eyes projecting from the support, and 7 rod sections slidable in said eyes. The rod-sections have ends thereof in screw-thread connection with a coupling-sleeve 8, and thus the complete rod or main slide member of the herein described mechanism may be indefinitely continued according to the demands of the trade. The jointing of said slide member makes it possible to ship the whole of the same in a package of comparatively short length, this being an advantageous feature of its construction. A hook-end 9 of the aforesaid slide member extends through a slot 10 in a lever 11 pivoted at its lower end to the support 5, and the hook is normally caught in a notched gravity latch 12 also pivoted at one end to said support. A chain or cable 13 has branches 14, 15, thereof connected to the otherwise free ends of the lever and latch, and said chain, trained on a pulley 16 or a plurality of the same, is designed to lead outside of the stable, through a wall of the same, where it may hang within convenient reach of an operator.

Designed to be rigidly secured in connection with each section 7 of the main slide member of the mechanism is the vertical shank 17' of the horizontal bolt 17 that of itself has sliding engagement with apertured branches of a forked keeper 18 attached to the support 5. When engaged with its keeper, the bolt extends through a hitching-ring 19 in connection with a halter 20 attachable to a head-stall or collar of a stabled animal, and a stop-bracket 21 is fastened by screws 22 or other suitable means to the support 5 in the retractive path of the bolt-shank.

It is preferable to have an angular fit of the bolt-shank aforesaid, in the main slide member, its upper end being round and threaded for the engagement of a nut 23 opposing said slide member. It is also preferable to have an angular fit of the shank 18' of the bolt-keeper in the support 5 through which it extends, a portion of the keeper-shank being round and threaded for the engagement of a nut 24 run thereon against a washer 25 facing said support.

By lifting the latch 12 and manipulating the lever 11, all of the bolts 17 of the mechanism are retracted to free the hitching rings through which they extend, whereby the previously tied animals are turned loose. The lifting of the latch and operation of the lever may be effected inside of the stable or the chain 13 may be manipulated outside of said stable to lift said latch and effect an operation of said lever. In either event the movement of the main slide member of the mechanism in its guides is limited by the stop-bracket 21 positioned as aforesaid.

I claim:

1. A device of the kind described comprising an actuating rod having one end provided with a hook, a pivoted lever provided with an intermediate slot through which the hook of the said rod projects, pivoted means adapted to engage the projecting portion of the hook to prevent movement of the rod, and means operable from a distant point for disengaging the movement preventing means from the hook and simultaneously operating the lever to actuate the rod.

2. A device of the kind described comprising a slidably mounted actuating rod, one end of the rod being bent at right angles, a pivoted lever provided with a slot through which the bent portion of the rod protrudes, a gravity locking device provided with means for engaging the protruding portion of the bent end of the rod to normally prevent movement of said rod, and means operable from a distant point for releasing the locking device and actuating the lever to cause the lever to impart a sliding movement to the rod.

3. A device of the kind described comprising a slidably mounted actuating rod provided with a right-angularly projecting hook at one end, a lever pivotally mounted and having an intermediate longitudinally extending slot through which the hook of the actuating rod projects, a pivotally mounted latch having a notch for engaging the projecting end of the said hook, and a cable operable from a distant point and having connections with the free ends of the lever and the latch.

In testimony that I claim the foregoing I have hereunto set my hand at Walsh in the county of Marinette and State of Wisconsin in the presence of two witnesses.

FRANK J. VICKMAN.

Witnesses:
F. P. ROMPF,
JOHN MOORE.

Copies of this patent may be obtained for five cents each, by addressing the "Commissioner of Patents, Washington, D. C."